W. E. SHARP.
NUT LOCK.
APPLICATION FILED AUG. 22, 1914.
1,228,704.
Patented June 5, 1917.
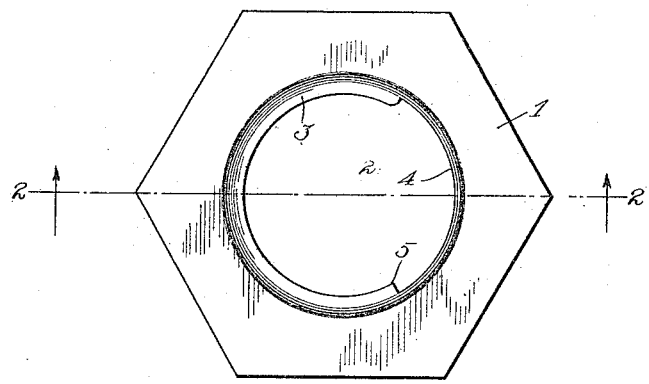
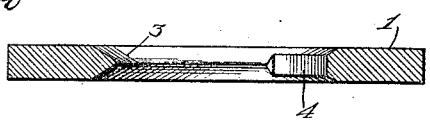
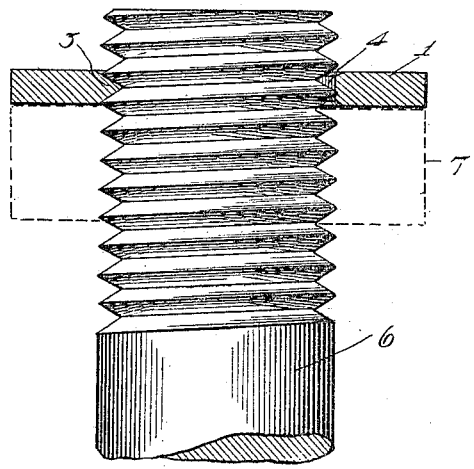
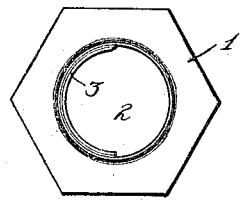
Witnesses:
Arthur W. Carlson
Geo. R. Carlson.
Inventor
William E. Sharp
By Hill & Fice
Attorneys

UNITED STATES PATENT OFFICE.

WILLIAM E. SHARP, OF CHICAGO, ILLINOIS, ASSIGNOR TO GRIP NUT COMPANY, OF CHICAGO, ILLINOIS, A CORPORATION OF ILLINOIS.

NUT-LOCK.

1,228,704. Specification of Letters Patent. Patented June 5, 1917.

Application filed August 22, 1914. Serial No. 858,030.

*To all whom it may concern:*

Be it known that I, WILLIAM E. SHARP, a citizen of the United States of America, residing at Chicago, county of Cook, and State of Illinois, have invented certain new and useful Improvements in Nut-Locks, of which the following is a description.

My invention belongs to that general class of devices designed to be used in coöperation with the ordinary holding bolt nut to prevent the nut from becoming accidentally disengaged from the bolt by reason of jar or vibration, or from any other cause. To this end it consists in the novel construction, arrangement and combination of parts herein shown and described, and more particularly pointed out in the claims.

In the drawings, wherein like reference characters indicate like or corresponding parts, Figure 1 is a plan view of my improved nut lock;

Fig. 2 is a section substantially on line 2, 2 of Fig. 1;

Fig. 3 shows a bolt with my improved nut lock mounted thereon, and shown in section to illustrate the operation of the lock, and Fig. 4 is a slight modification of the form shown in Fig. 1.

My improved nut lock is designed to be stamped out of a single plate of metal of any suitable outline for the ready engagement of the wrench. 1 illustrates the plate, in which is formed a bolt hole 2. In stamping out the plate or lock, a part of the wall is upset, driving the material back into the plate, thus forming a V-shaped thread or part as shown at 3, of suitable form to adapt it to engage with the thread of the bolt to which it is applied. As shown, this thread does not extend the entire circumference of the wall of the bolt hole, but leaves a section as at 4 without any thread, the wall at that point being substantially at a right angle to the face of the plate.

To secure the most satisfactory results, the bolt hole, if round, should be relatively of such size as compared with the bolt upon which the lock is to be used, as to constitute what may be termed a tight or snug fit, in fact slightly smaller than the bolt, permitting the lock to be partially threaded on the bolt by the fingers, to a point where a wrench may be employed, thereafter requiring the force of the wrench to seat the lock. The thread engagement locks the nut lock upon the bolt in such a manner as to prevent longitudinal movement, and in turning the lock leads it longitudinally on the bolt, and the vertical wall 4 by reason of the tight fit aforesaid, impinges upon the apexes of the bolt thread, and forcibly draws the V-shaped part into the thread recess of the bolt. This impinging and forcibly drawing action causes a double effect. It causes the apex of the bolt thread to tend to cut into the vertical wall, and at the same time to blunt or otherwise mutilate the sharp apex of the thread, as the lock is forced to its seat, and at the same time it forcibly draws the V-shaped part of the lock into effective frictional contact with the walls of the bolt thread. This action continues to the point where the lock ceases in its rotation upon the bolt. The snug or tight fit of the lock upon the bolt, the pressing of the edge of the lock thread into the root of the bolt thread, also bringing the sides of the thread on nut lock and bolt in strong frictional engagement, the slight mutilation of the apex of the bolt thread, the friction of the blunted apex upon the scarified or cut face of the vertical wall of the lock, and the impinging action of the preferably sharp corner 5 of the lock thread upon the root of thread of the bolt, all coöperate to secure a firm lock of the nut lock upon the bolt, effectively preventing any accidental loosening by jar, vibration, or otherwise, thus firmly retaining the holding nut in its seated position upon the bolt. The holding nut 7 is shown in dotted lines in Fig. 3.

Fig. 4 shows a similar lock with the exception that the threaded part 3 extends substantially only one-half about the bolt hole 2 in the lock nut, while in the preferred form shown in Fig. 1, it is substantially two-thirds or more of the circumference of the bolt hole.

In actual practice and under trying conditions, I have secured very satisfactory results with the form shown in Fig. 4, although the preferred construction is substantially as shown in Fig. 1, as stated.

Having thus described my invention, what I claim as new and desire to secure by Letters Patent is:—

1. A lock nut, comprising a metal plate of suitable size and form, and having a bolt hole formed therein, with a single section of the wall of the hole less than the entire circumference thereof, V-shaped to engage a bolt thread and the remaining part of the wall substantially at right angles to the surface of the plate, and adapted to impinge upon the apexes of the thread of a bolt upon which the lock is mounted.

2. A lock nut, comprising a metal plate of suitable size and form, and having a bolt hole formed therein, with a single section of the wall of the hole less than the entire circumference thereof and V-shaped to engage a bolt thread, and the remaining part of the wall substantially at right angles to the surface of the plate, and adapted to impinge upon the apexes of the thread of a bolt upon which the lock is mounted, the advancing end of the nut thread in the direction in which the nut would be rotated when backed off a bolt, being formed with an impinging point adapted to impinge upon the proximate part of a bolt.

3. A threaded bolt in combination with a lock nut, comprising a metal plate of suitable size and form, and having a bolt hole formed therein of a size adapting it to tightly fit upon the said bolt, a single section of the wall of the bolt hole less than the circumference thereof V-shaped to engage the bolt thread, and the remaining part of the wall substantially at right angles to the surface of the plate and adapted to impinge upon the apexes of the bolt thread, substantially as described.

4. A threaded bolt in combination with a lock nut, comprising a metal plate of suitable size and form, and having a bolt hole formed therein of a size adapting it to form a binding fit upon the bolt, with a single part of the wall of the bolt hole less than the entire circumference thereof shaped to engage the bolt thread, and the remaining part of the wall adapted to impinge upon the apexes of the bolt thread, the advancing end of the nut thread, as the plate is backed off the bolt, being formed with an impinging point adapted to impinge upon the proximate part of the bolt.

In testimony whereof, I have hereunto signed my name in the presence of two subscribing witnesses.

WILLIAM E. SHARP.

Witnesses:
H. F. ALLEN,
A. J. CLARK.